(12) United States Patent
Braganca et al.

(10) Patent No.: US 10,352,543 B1
(45) Date of Patent: Jul. 16, 2019

(54) CORDLESS LED HEADLIGHT AND CONTROL THEREOF

(71) Applicant: Designs for Vision, Inc., Bohemia, NY (US)

(72) Inventors: Kenneth Braganca, Sayville, NY (US); John T. Walsh, Northport, NY (US); Matthew Kenyon, St. James, NY (US)

(73) Assignee: Designs for Vision, Inc., Bohemia, NY (US)

( * ) Notice: Subject to any disclaimer, the term of this patent is extended or adjusted under 35 U.S.C. 154(b) by 0 days.

(21) Appl. No.: 16/209,908

(22) Filed: Dec. 4, 2018

Related U.S. Application Data

(63) Continuation of application No. 14/924,621, filed on Oct. 27, 2015.

(60) Provisional application No. 62/092,779, filed on Dec. 16, 2014.

(51) Int. Cl.
| | | |
|---|---|---|
| *F21L 4/04* | (2006.01) | |
| *F21V 14/02* | (2006.01) | |
| *F21V 23/02* | (2006.01) | |
| *F21V 23/04* | (2006.01) | |
| *G02C 11/04* | (2006.01) | |
| *F21V 21/084* | (2006.01) | |
| *F21W 131/20* | (2006.01) | |
| *F21Y 101/00* | (2016.01) | |

(52) U.S. Cl.
CPC .............. *F21V 23/023* (2013.01); *F21L 4/04* (2013.01); *F21V 14/02* (2013.01); *F21V 21/084* (2013.01); *F21V 23/0471* (2013.01); *G02C 11/04* (2013.01); *F21W 2131/20* (2013.01); *F21Y 2101/00* (2013.01)

(58) Field of Classification Search
CPC .. F21V 23/023; F21V 23/0471; F21V 21/084; F21V 14/02; F21L 4/04; G02C 11/04
See application file for complete search history.

(56) References Cited

U.S. PATENT DOCUMENTS

| | | |
|---|---|---|
| 3,890,303 A | 8/1975 | Herbits |
| 4,195,918 A | 4/1980 | Freche |
| 4,538,070 A | 8/1985 | Herold |
| 5,440,462 A | 8/1995 | Kim |
| 5,637,863 A | 6/1997 | Sanborn |
| 5,722,762 A | 3/1998 | Soll |
| 6,290,368 B1 | 9/2001 | Lehrer |
| 6,443,604 B1 | 9/2002 | Rudenberg |
| 6,461,024 B1 | 10/2002 | Becker |
| 6,465,962 B1 | 10/2002 | Fu |
| 6,505,951 B1 | 1/2003 | Lorenzo, Jr. |
| 6,930,603 B2 | 10/2005 | Jackson |
| 6,955,444 B2 | 10/2005 | Gupta |
| 7,008,074 B1 | 3/2006 | Halm |
| 7,115,856 B2 | 10/2006 | Peng |
| 7,321,301 B2 | 1/2008 | Spoltore |

(Continued)

FOREIGN PATENT DOCUMENTS

WO WO 2006099676 9/2006

*Primary Examiner* — Thomas M Sember
(74) *Attorney, Agent, or Firm* — Law Office of Carl Giordano, PC

(57) ABSTRACT

A wireless headlight assembly for attachment to an eyewear frame is disclosed. The wireless headlight assembly comprises a battery pod containing a battery connected to a lower housing element, which controls the application of power from the battery to an attached headlight assembly containing a headlight.

19 Claims, 8 Drawing Sheets

(56) References Cited

U.S. PATENT DOCUMENTS

| | | |
|---|---|---|
| 7,604,378 B2 | 10/2009 | Wolf |
| 7,884,733 B2 | 2/2011 | O'Dowd |
| 2004/0240208 A1 | 12/2004 | Beasley |
| 2004/0264175 A1 | 12/2004 | Willougbly |
| 2004/0264176 A1 | 12/2004 | Vandershuit |
| 2005/0099824 A1 | 5/2005 | Dowling |
| 2006/0023455 A1 | 2/2006 | Hardin |
| 2008/0205036 A1 | 8/2008 | Tarter |
| 2008/0310145 A1 | 12/2008 | Blake |
| 2012/0120636 A1 | 5/2012 | Wilt |
| 2012/0275140 A1 | 11/2012 | Feinbloom |
| 2015/0377462 A1 | 12/2015 | Wilt |

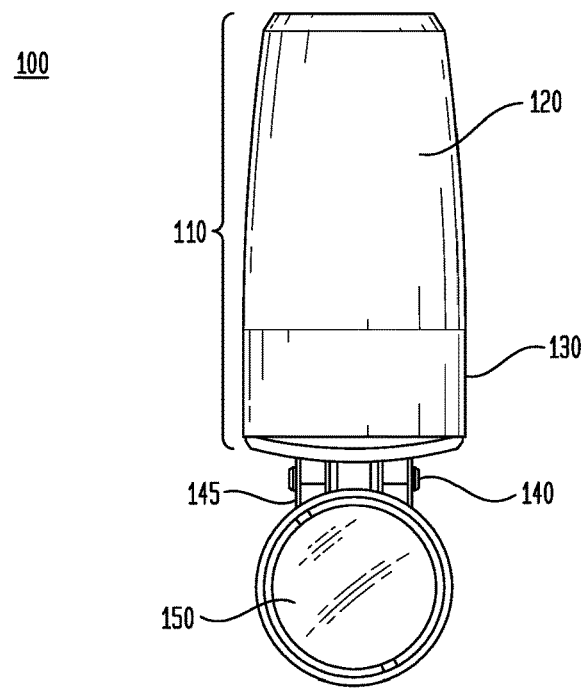
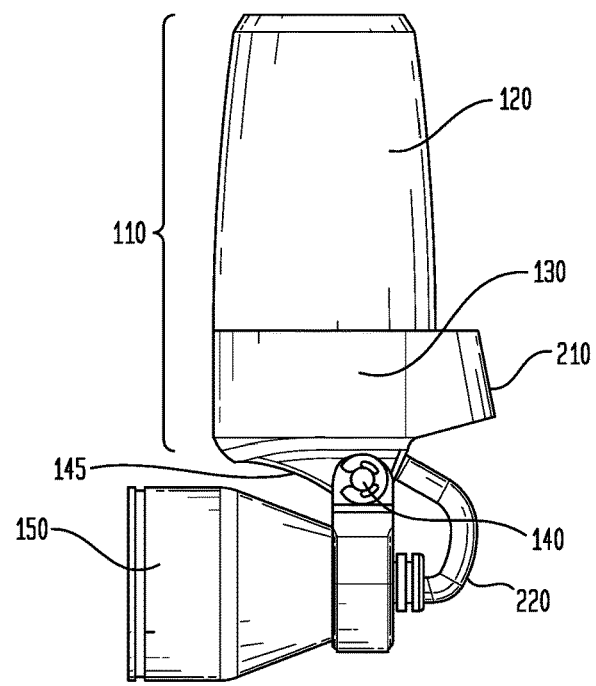

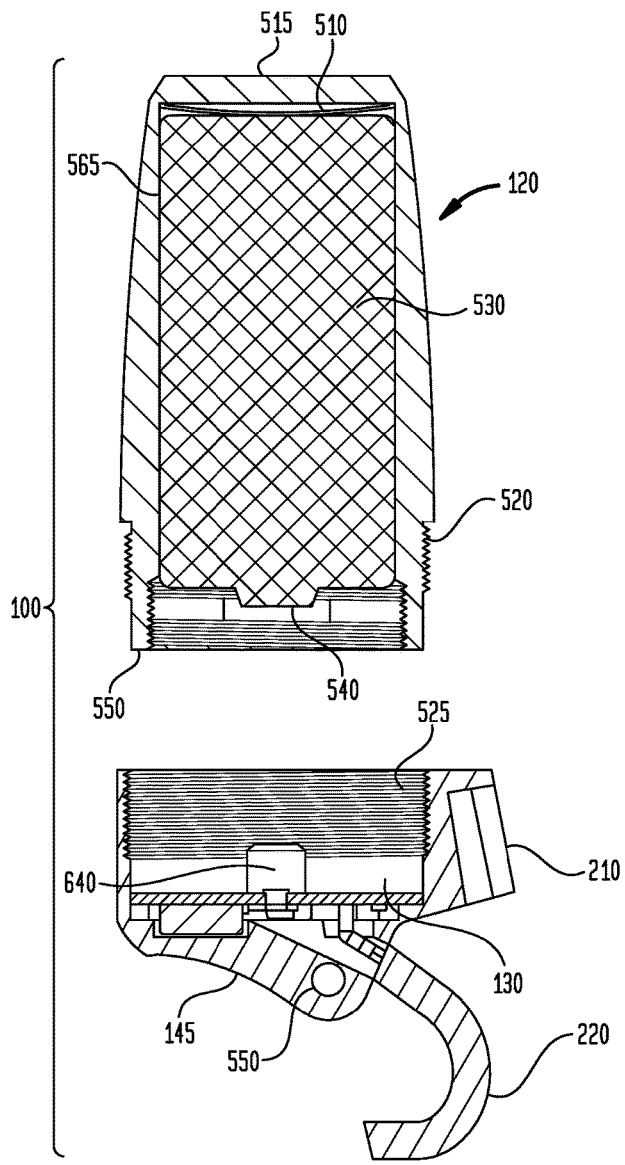
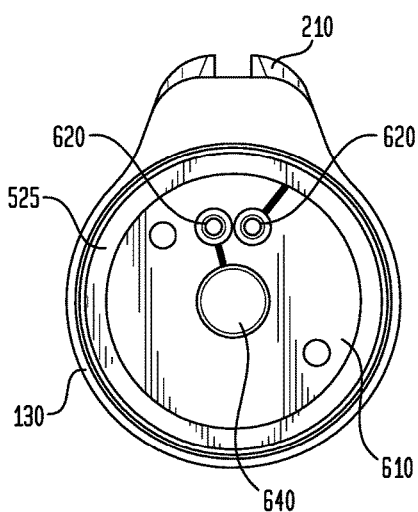

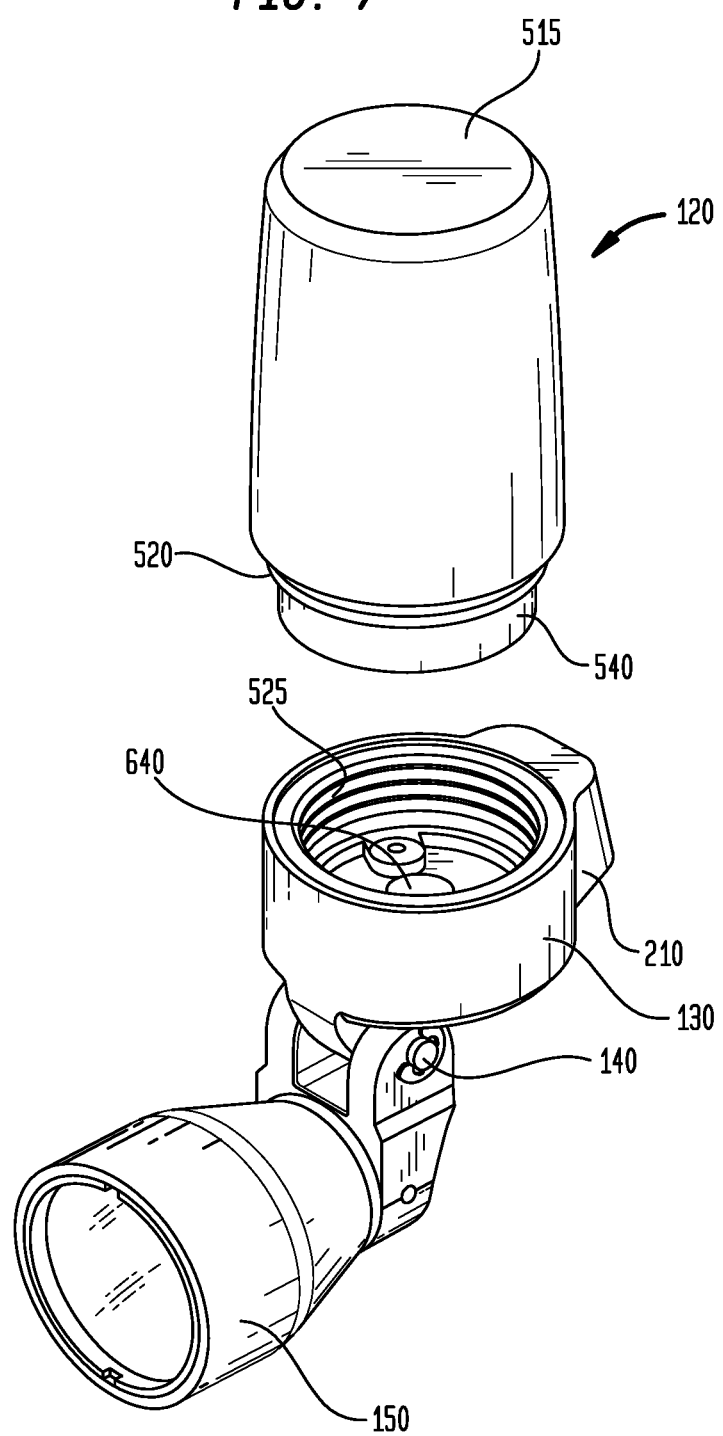

CORDLESS LED HEADLIGHT AND CONTROL THEREOF

CLAIM OF PRIORITY

This application claims, pursuant to 35 USC 120, priority to and the benefit of the earlier filing data, as a Continuation application, to that application filed on Oct. 27, 2015 and afforded Ser. No. 14/924,621, which claimed, pursuant to 35 USC 119, the benefit of the earlier filing date of provisional patent application filed on Dec. 16, 2014 and afforded Ser. No. 62/092,779, the entire contents of which are incorporated by reference, herein.

This application is related to that patent application filed on Dec. 4, 2018 and afforded Ser. No. 16/209,902, which is a Continuation application of that patent application filed on Oct. 27, 2015 and afforded Ser. No. 14/924,621, the contents of which are incorporated by reference, herein.

FIELD OF THE INVENTION

The instant application relates to the field of optics and more particularly to a portable illuminating device for illuminating a designated area, particularly in medical fields.

BACKGROUND OF THE INVENTION

Professionals, such as operating doctors, dentists, hygienists, EMT, etc., require a light to provide adequate illumination to the operating filed. Having this light comes from the point of view of the user allows for shadow-free operation. The technology for providing the medical field, for example, this illumination is dominated by battery powered LED headlights. For example, U.S. Pat. No. 8,851,709, which is assigned to the Assignee of the instant application, and whose contents is incorporated by reference, herein, discloses a headlight mounted illumination device comprising a user-worn battery pack that provides electrical energy to a surgical glass headlight (see FIGS. 3 and 4, for example). This system incorporates a rechargeable battery pack with a power cord connected to a head or frame (temple) mounted LED headlight. The power cord extends from the battery pack, which may be located on a belt or a shirt, for example, up towards the frame and routed along the frame towards the headlight assembly.

This current technology is cumbersome for the user as the battery pack is uncomfortable to wear and management of the power cord requires special care to avoid the cord catching on things in the working environment or interfering with the medical professional's movement.

Hence there is a need in the industry for a system that provides appropriate electrical energy to the head-mounted light while eliminating the burden that the power cord introduces.

SUMMARY OF THE INVENTION

A device for providing adequate illumination to an operating field wherein the headlight is powered without the use of a power cord is disclosed.

The device comprises a removable, rechargeable, battery (e.g., lithium-ion) placed in a battery pod connected to a mounted headlight (e.g., LED).

In one aspect of the invention, the connection between the battery pod and a printed circuit board (PCB) controlling a mounted headlight may be made by a mechanical connection, including but not limited to treads, quarter-turn fastener, magnets, ball plungers, expanding collar, cam lock coiled springs, bayonet mounts, etc. to provide simple installation and removal for recharging the contained battery.

The headlight may be activated (or deactivated) by making (or breaking) a mechanical connection to the PCB or by electrical means, wherein a switch may be controlled to electrically connect (or disconnect) the battery from the headlight.

In one aspect of the invention, an electrical connection may be made (or broken) by one or more of RF (radio frequency) remote control, an IR (infrared) remote control, a visible remote control, a sonic motion sensing control, a gesturing, a physical switch, Bluetooth, Wi-Fi, voice commands, etc.

In accordance with one aspect of the invention, a T-mount connection is made between the cordless headlight assembly and the headset or frame to which the cordless headlight assembly may be connected. In one aspect of the invention, the battery pod may be tilted at a backward angle to render a majority of the weight of the battery pod closer to the user.

In accordance with the principles of the invention, the cordless headlight may be removably mounted (e.g., T-mount connection), or fixed, to a headset or frame. In one aspect of the invention, the orientation of the cordless headlight assembly (or battery pod assembly) may be determined by its relation to the T-mount connection. In another aspect of the invention, the orientation of the cordless headlight assembly (or battery pod assembly) may be adjusted through a pivotable connection.

In accordance with the principles of the invention, a headlight assembly may be connected to a battery pod assembly through a rotating hinge, mounted in a coaxial position. The rotating hinge provides for a pivotal adjustment of the headlight to adjust the light beam generated by the headlight while minimizing shadows cast by the light due to its close proximity to the user's line of sight.

In accordance with the principles of the invention, the headlight may be mounted in a forward position to provide comfort to the user by maintaining the headlight at an appropriate distance from the user.

In accordance with the principles of the invention, an internal connection between a battery in the battery pod and the headlight is advantageous as it provides more room for the user by keeping the headlight away from the user.

In one aspect of the invention a single or dual-bay smart charging cradle may be employed that provides for rapid recharging of one or more batteries. The use of smart charging cradle allows for the continuous use of headlight operation by swapping out (and recharging) spent batteries.

BRIEF DESCRIPTION OF THE FIGURES

For a better understanding of exemplary embodiments and to show how the same may be carried into effect, reference is made to the accompanying drawings. It is stressed that the particulars shown are by way of example only and for purposes of illustrative discussion of the preferred embodiments of the present disclosure, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 1 illustrates a front view of an exemplary embodiment of a cordless powered headlight assembly in accordance with the principles of the invention.

FIG. 2 illustrates a side view of an exemplary embodiment of a cordless powered headlight assembly in accordance with the principles of the invention.

FIG. 5 illustrates an exploded side view of a battery pod in accordance with the principles of the invention.

FIG. 6 illustrates a top view of the battery pod connector in accordance with the principles of the invention.

FIG. 7 illustrates an exploded perspective view of the cordless headlight assembly in accordance with the principles of the invention.

Figure 3:
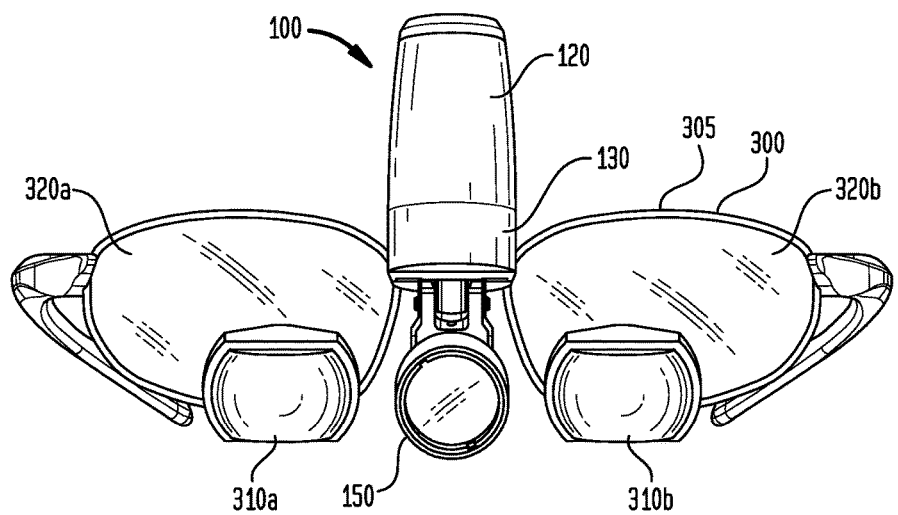
FIG. 3 illustrates an exemplary application of an exemplary cordless powered headlight assembly in accordance with the principles of the invention.

It is to be understood that the figures and descriptions of the present invention described herein have been simplified to illustrate the elements that are relevant for a clear understanding of the present invention, while eliminating, for purposes of clarity many other elements. However, because these omitted elements are well-known in the art, and because they do not facilitate a better understanding of the present invention, a discussion of such element is not provided herein. The disclosure herein is directed to also variations and modifications known to those skilled in the art.

DETAILED DESCRIPTION

FIG. 1 illustrates a front view of exemplary embodiment of a cordless powered headlight assembly 100 in accordance with the principles of the invention. In this illustrated embodiment, cordless headlight assembly 100 comprises a battery assembly 110 and a headlight assembly 150. Battery assembly 110 is comprised of a battery pod 120 element and a lower housing or connector element 130, wherein a first end of battery assembly 110 connects or contacts lower housing 130. Battery assembly 110 is connected (pivotally) to headlight assembly 150 at (rotatable) connector 145. Connection pin 140, inserted into connector 145, as will be further explained, provides for a pivotal rotation of headlight assembly 150 with respect to battery assembly 110.

FIG. 2 illustrates a side view of exemplary embodiment of the cordless powered headlight assembly shown in FIG. 1.

In this illustrated embodiment, battery assembly 110 is shown connected to a distal end of headlight assembly 150 by pin 140, which is positioned transverse to the orientation of headlight assembly 150. Pin 140 allows adjustment of headlight assembly 150 with respect to battery assembly 110. As would be appreciated, a set screw (not shown) or other similar retaining means may engage pin 140 through connector 145 to retain a desired orientation of headlight assembly 150 with respect to battery assembly 110.

Also shown is connector 210, which may be used to connect cordless headlight assembly 100 to a frame or other mounting element (not shown) as will be further explained. In one aspect of the invention, connector 210 may be a T-slot connector (i.e., T-mount), which allows for the non-permanent attachment of cordless headlight assembly 100 to a frame or other mounting element.

Also shown is connector 220. Connector 220 extending from battery assembly 110 to a distal end of headlight assembly 150 provides electrical energy to the lighting element (not shown) contained in headlight assembly 150.

FIG. 3 illustrates a front view of an application of the exemplary cordless powered headlight assembly shown in FIG. 1.

In this illustrated embodiment, assembly 100 is attached to a frame 305 of an eyewear 300 specialized for the medical and/or dental industries. Eyewear 300 comprises left and right lens 320a, 320b, respectively. Left and right lens 320a, 320b may be ordinary glasswear or may be prescriptive glasswear. Also illustrated are telescopic lens 310a, 310b attached to corresponding left and right lens, 320a, 320b, respectively.

In one aspect of the invention, headlight assembly 150 is oriented at a depression angle (with respect to a horizontal light through eyewear 300) similar to that of the angle of telescopic lens 310a, 310b in order to direct light to a point that is substantially convergent with focal point of telescopic lens 310a, 310b.

Figure 4:
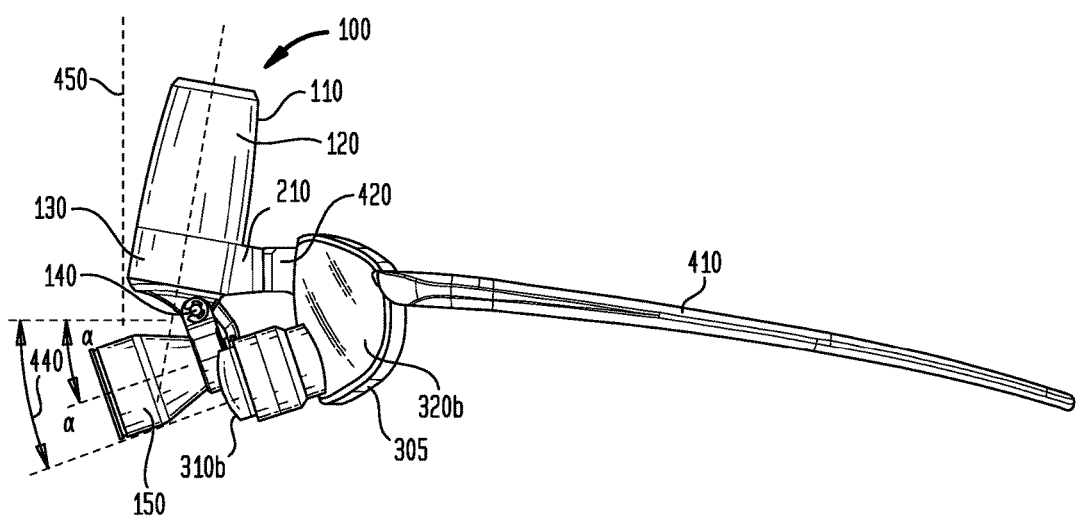
FIG. 4 illustrates a side view of an exemplary application of an exemplary cordless powered headlight assembly in accordance with the principles of the invention.

FIG. 4 illustrates a side view of an exemplary application of the exemplary cordless powered headlight assembly shown in FIG. 1.

In this illustrated embodiment, eyewear 300 includes frame 305 and temple 410. Temple 410 provides a conventional means for retaining eyewear 300 in place on a user's head.

Also, shown is mating connector 420 attached to frame 305. Mating connector 420 is positioned between lens 320a, 320b to retain cordless headlight assembly 100 substantially centered with regard to eyewear 300.

Also shown is connector 210, on cordless headlight assembly 100, attached to mating connector 420. As previously discussed, connector 210 and mating connector 420 may be T-slot connectors that allow cordless headlight assembly to be removable from eyewear 300. In another aspect of the invention, connector 210 and 420 may provide for a fixed attachment, wherein the connectors 210 and 420 are a single unit.

Headlight assembly 150 is oriented at a substantially same depression angle ($\alpha$) as telescopic lens 310 (310a and 310b) with respect to horizontal axis 440. Furthermore, battery assembly 110 is shown oriented backward with respect to a line 450 projecting substantially perpendicular to horizontal axis 440. The orientation of battery assembly 110 may be determined by the relationship between the T-mount connectors 210 and 420. The angle of orientation of battery assembly 110 with respect to headlight assembly 150 may be determined based, in part, to maintain an obtuse angle between the of headlight assembly 150 and the battery pod 110. In a preferred embodiment the angle of orientation of battery assembly 110 with respect to the perpendicular line 450 is in a range of 5-25 degrees.

FIG. 5 illustrates an exploded side view of battery assembly 100 in accordance with the principles of the invention.

In this illustrated embodiment, battery 530 is contained within battery pod 120. Battery pod 120 includes, at its second end, a dome spring cover 515 that covers spring 510. Dome spring cover 515 may be a flexible covering (e.g., rubber, thin metal or plastic) that allows for deformation of spring cover 515. At the nadir of the deflection of spring cover 515, spring cover 515 engages spring 510. Spring 510 may represent a conventional spring loaded on-off type spring which is rendered in a first position upon a first engagement with cover 515 and is rendered in a second position upon a second engagement with cover 515. In this illustrated embodiment, spring 510, which has a concave shape, operates as a switch to contact a first end of battery 530 contained within battery pod 120 when spring 510 is in a first position and may not contact the first end of battery 530 when spring 510 is in a second position.

Also illustrated are treads 520 circumscribing an end of battery pod 120. Treads 520 provide a means for battery pod 120 to engage housing or connector element 130. Threads 520 further are electrically connected to the first end of battery 530 when spring 510 is in a position to contact the first end of battery 530. Threads 520 may be electrically connected to first end of battery 530 by an electrical connector 565 that extends from spring 510 to threads 520 alongside battery 530.

In one aspect of the invention, a first depression of spring cover 515 causes spring 510 to engage the first end of battery 530 to provide an electrical path to threads 520 through connector 565. Wherein a second depression of spring cover 515 causes spring 510 to disengage the first end of battery 530 causing threads 520 to be electrically isolated from battery 530.

Further illustrated is center electrode 540 of battery 530 located at a second end of battery 530. As is understood in the conventional field of battery technology, the first end of battery 530 may represent a negative potential or charge and the center electrode 540 of the second end of battery 530 may represent a positive potential or charge.

Although, battery 530 is shown having a negative charged first end, it would be recognized that the orientation of battery 530 within battery pod 120 may be altered without altering the scope of the invention. In this case, a corresponding change in wiring provides for the proper electrical polarity to the lighting element (not shown).

Also shown is housing or connector element 130 and connector 145. Within, and transverse to, connector 145 is pass-through 550. Pass-through 550 allows pin 140 to connect housing element 130 to headlight assembly 150, as previously discussed. Rotation of headlight assembly 150 about pin 140 provides for a change in orientation of headlight assembly 150 with respect to housing element 130 and battery pod 110.

Also shown, within housing element 130 are screw threads 525. Screw treads 525 engage threads 520 to connect battery pod 120 to housing element 130. In addition, treads 525 provide an electrical connection between pod 120 (when treads 520 are negatively charged, for example) to allow electrical energy to flow through connectors 220 to housing assembly 150 (not shown).

Accordingly when cover 515 is depressed a first time, electrical energy is provided to the headlight assembly 150 and a second depression of cover 515 removes electrical energy from the headlight assembly 150.

In another aspect of the invention, spring 510 may be permanently retained in the first position such that spring 510 engages one end of battery 530, such that connection of cover 120 through threads 520 and 525 causes electrical flow to headlight assembly 150.

In a further aspect when battery cover 120 is composed of an electrically conductive material (e.g., aluminum) then battery cover 120 provides an electrical path for electricity to flow to threads 520.

FIG. 6 illustrates a top view of housing element 130 in accordance with the principles of the invention.

In this illustrative embodiment, center electrical connector 640 represents a connection point that enables the electrical potential on center electrode 540 of battery 530 to pass through to a printed circuit board 610. The printed circuit board 610 includes circuitry (hardware; dedicated or specialized) that controls the passage of electrical energy to the headlight (not shown) in headlight assembly 150. Also shown are wire connectors 620, through which electrical energy is passed from printed circuit board 610 to headlight housing 150.

FIG. 7 illustrates an exploded perspective view of the cordless headlight assembly in accordance with the principles of the invention.

As illustrated, battery pod 120 may engage housing element 130 by screwing pod 120 into housing element 130. Center connector 640 engages center probe 540 when pod 120 is completely screwed into housing element 130.

Although it has been discussed that screw threads 520 engage screw threads 525 to connect pod 120 to housing element 130, it would be recognized that the means to engage pod 120 with housing element 130 may be selected as one of: a bayonet connection, a quarter-turn locking connection, a snap-in connection, etc. in place of a screw thread connection illustrated.

Figure 8A:
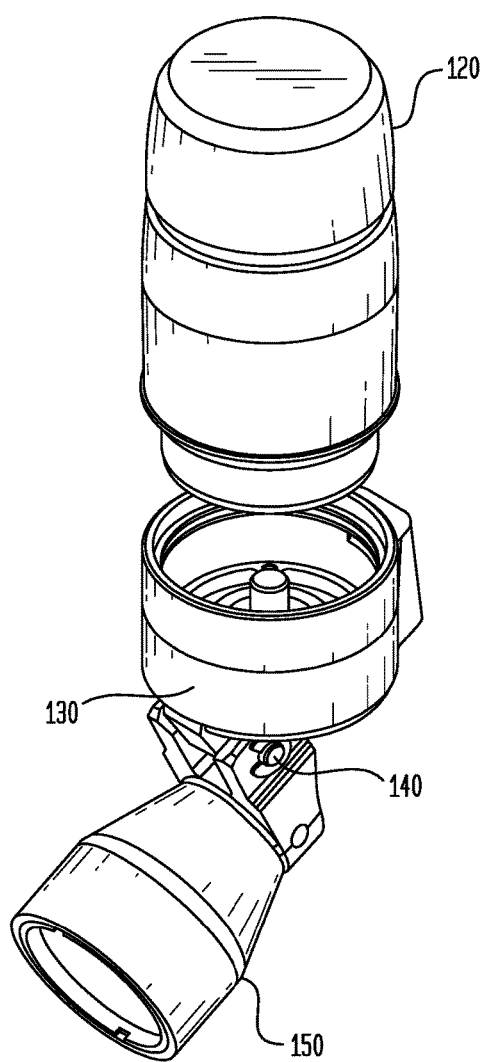
FIG. 8A illustrates an exploded perspective view of a second embodiment of the cordless headlight assembly in accordance with the principles of the invention

FIG. 8A illustrates a perspective view of a second embodiment of the cordless headlight assembly in accordance with the principles of the invention.

In the illustrated embodiment shown in FIG. 8A, battery pod 120 engages a housing or connector element 130, as previously described. Battery pod 120 may engage housing or connector element 130 by means of a screw thread attachment, a slip joint attachment, a bayonet attachment, etc., as previously discussed.

Figure 8B:
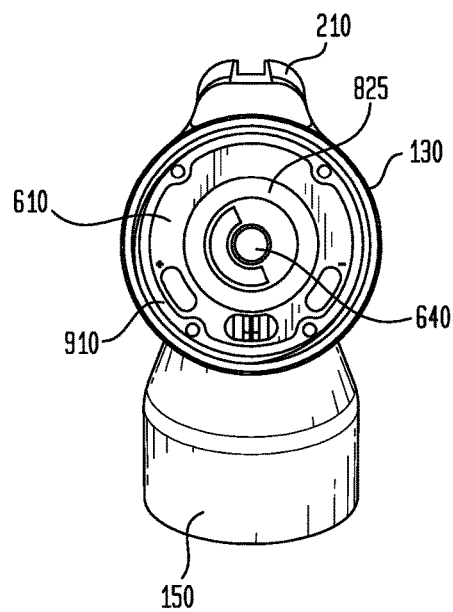
FIG. 8B illustrates a top view of the battery pod connector in accordance with the second embodiment of the cordless headlight assembly shown in FIG. 8A.

FIG. 8B illustrates a top view of the lower portion of the battery pod in accordance with the second embodiment of the cordless headlight assembly shown in FIG. 8A.

In this illustrated second embodiment, an inner positive ring or center contact 640 (as previously discussed) and an outer negative ring 825 are shown. Positive ring or center contact 640 engages a positive terminal of a battery element (not shown but similar to battery 530 shown in FIG. 5) and negative ring 825 engages a negative terminal of the battery element. In this case, battery element (not shown) is formed in a manner wherein the positive and negative terminals of the battery element are presented on one end of the battery element. The construction of battery element in this manner is similar to the construction of a conventional 9 volt battery, wherein the positive and negative terminals are contained on a single surface of the battery.

Figure 8C:
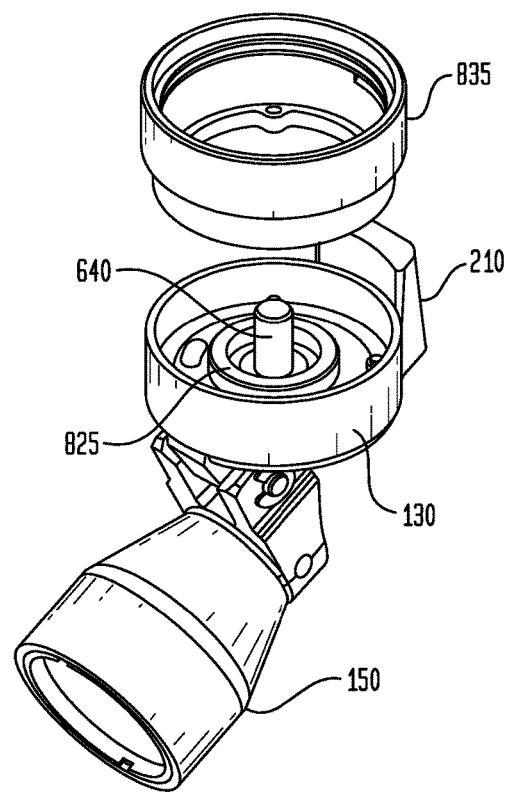
FIG. 8C illustrates an exploded perspective view of the lower portion of the battery pod in accordance with the second embodiment of the cordless headlight assembly shown in FIG. 8A.

FIG. 8C illustrates an exploded perspective view of the connector 130 in accordance with the second embodiment of the cordless headlight assembly 100 shown in FIG. 8A.

In this illustrated embodiment, a metal ring 835 provides a capacitive touch switch assembly, to operate the headlight contained in headlight assembly 150. In this illustrated embodiment, metal ring 835 contacts the PCB 610 through a contact ring 910 (see FIG. 8B) when the battery pod 120 engages connector 130

In accordance with the principles of the invention, the PCB 610 monitors the metal ring 835 for a change in capacitance. In one aspect of the invention, when a change of capacitance is recognized (e.g., a finger touch to metal ring 835) power to the headlight in headlight assembly 150 may be at a maximum (full light intensity). Upon recognition of a next change in capacitance, the power applied to the headlight in headlight assembly 150 may be reduced to provide a lower light intensity output. A further touch may cause the headlight to be turned off. (e.g., removal of the power from the headlight).

Figure 9:
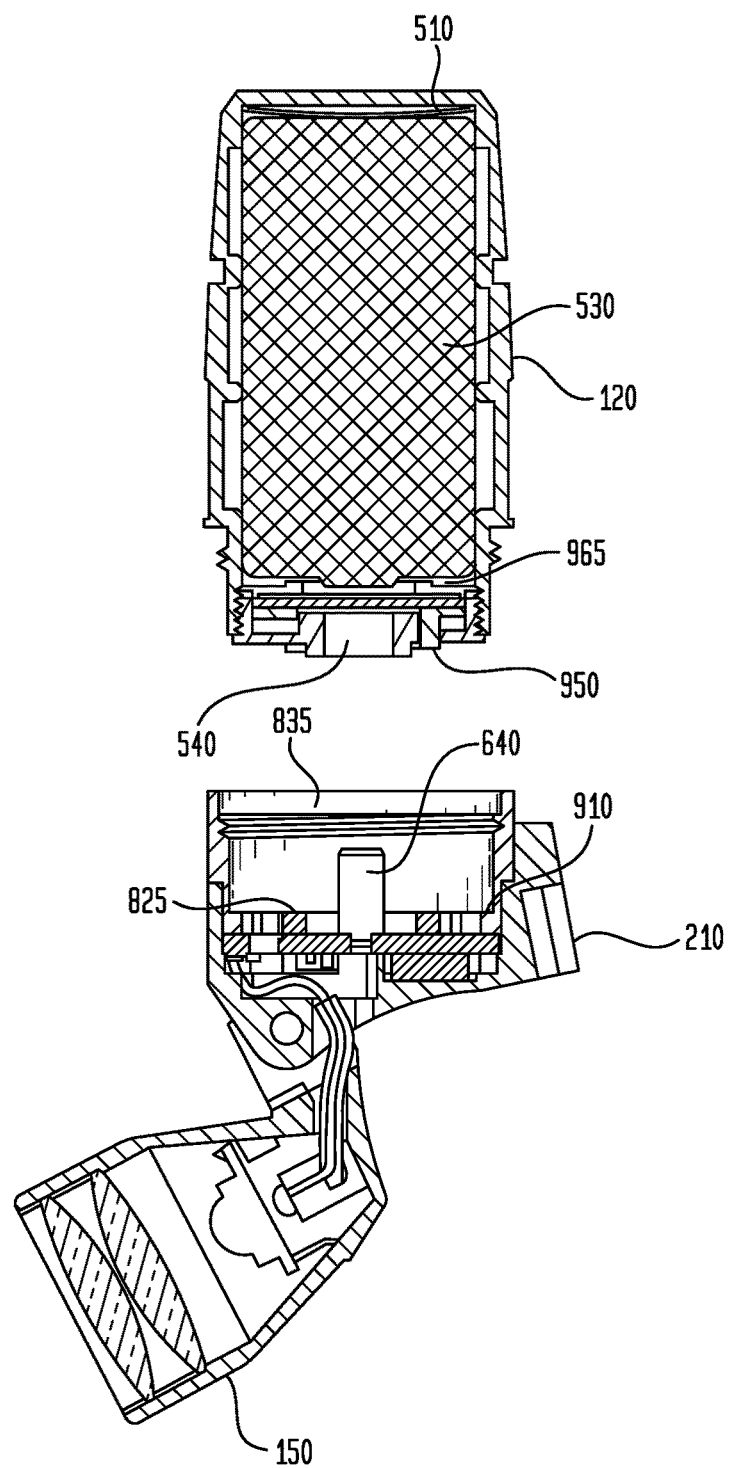
FIG. 9 illustrates a side view of a cordless headlight assembly in accordance with the principles of the invention.

FIG. 9 illustrates a side view of the second embodiment of the wireless headlight assembly 150 in accordance with the principles of the invention.

In this illustrated embodiment, positive contact 640 and negative ring 825 contact respective positive terminal 540 and negative terminal 950 of battery element 530. Further illustrated is contact ring 835 engaging capacitive ring 910 engaging PCB 610 (not shown).

Further shown is dome spring 510, previously described, and disk spring 965. The use of one or both of dome spring 510 and disk spring 965 is advantageous as the flexible material of the springs (e.g., metal spring, resilient material) retains the positive and negative terminals, 540, 950, respectively, of battery element 530 in contact with corresponding positive terminal 640 and negative ring 825. As would be appreciated, disc spring 965 may represent individual conductive or non-conductive elements positioned circularly between positive contact 640 and negative ring 825. Similarly disc spring 965 may represent a conductive or a non-conductive resilient material circular element positioned between the positive contact 640 and negative ring 825. Similarly, the disc spring 965 may be an conductive or non-conductive resilient material positioned outside of the negative ring 825.

Figure 10C:
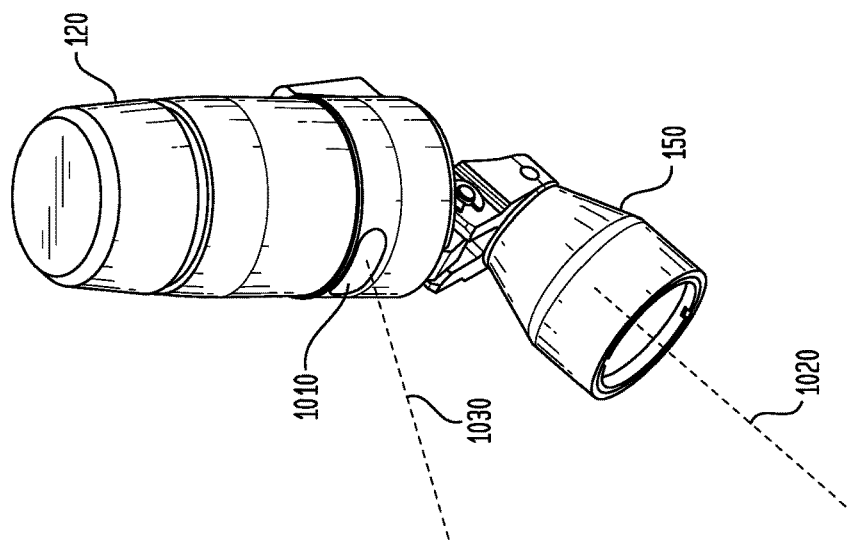
FIG. 10C illustrates a perspective view of a third embodiment of a cordless headlight assembly in accordance with the principles of the invention.
Figure 10B:
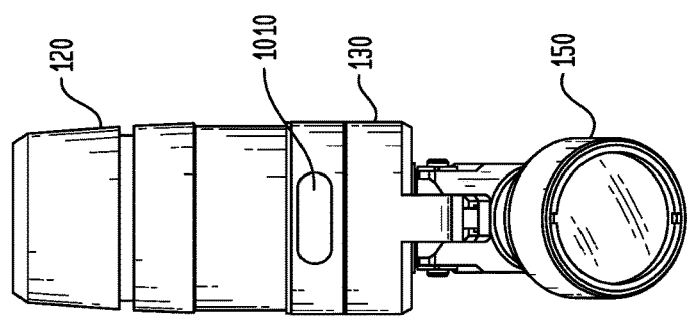
FIG. 10B illustrates a front view of a third embodiment of a cordless headlight assembly in accordance with the principles of the invention.
Figure 10A:
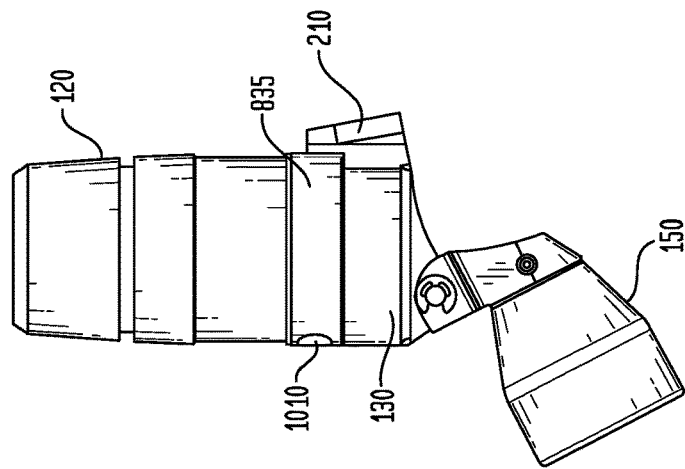
FIG. 10A illustrates a side view of a third embodiment of a cordless headlight assembly in accordance with the principles of the invention.

FIG. 10A illustrates a side view of a third embodiment of a cordless headlight assembly in accordance with the principles of the invention.

In the illustrated embodiment, which is similar to the embodiment shown in FIG. 8A, a translucent window 1010 is created in metal ring 835 (or connector 130). Translucent window 1010 allows for the output of a light (e.g., infra-red, visible), an audio signal and/or a radio frequency (RF) signal that may be used to provide for a contactless switching mechanism. U.S. Pat. No. 8,851,709, which is assigned to the owner of the instant application and is incorporated by reference herein discloses a contactless configuration.

FIG. 10B illustrates a front view of a cordless headlight assembly shown in FIG. 10A showing the translucent window 1010.

FIG. 10C illustrates a perspective view of the cordless headlight assembly shown in FIG. 10A, showing an axis 1030 of the outputted light, audio and/or RF signals and an axis 1020 of headlight assembly 150.

As shown, the output of infra-red light, for example, through translucent window 1010 is essentially horizontal (see axis 440, FIG. 4).

As discussed with regard to U.S. Pat. No. 8,851,709, the light output of the headlight (not shown) in headlight assembly 150 may be controlled by movement of a hand or object in front of translucent window 1010.

Figure 11:
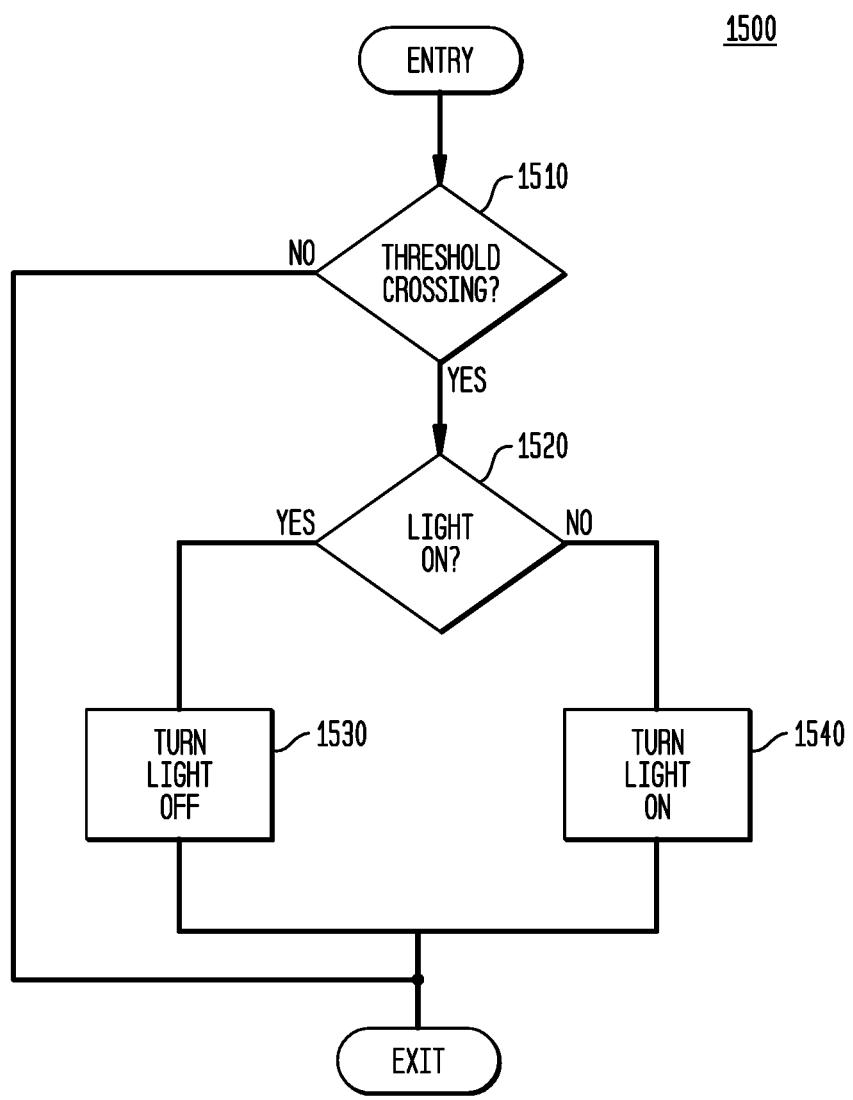
FIG. 11 illustrates a flowchart of an exemplary processing for controlling a light output of the cordless headlight assembly in accordance with the principles of the invention.

FIG. 11, herein, which corresponds to FIG. 15 of U.S. Pat. No. 8,851,709, illustrates an exemplary processing for controlling the application of electrical energy to cordless headlight assembly 150 shown in FIG. 10A-10C, for example.

As shown, at block 1510, a determination is made whether a reflected light, for example, crosses a threshold value. If not processing exits. However, if the reflected light is above the threshold value, then a determination is made whether the headlight is in an ON condition or an OFF condition (block 1520). If in the ON condition, then the headlight is turned off (block 1530) and if in the OFF condition then the headlight is turned on (block 1540). Thus, the electrical energy may be applied to (or removed from) the headlight in stages. The number of stages is determined by a desired granularity of the application of the electrical energy. FIG. 11 illustrates a coarse granularity of ON and OFF.

Processing similar to that shown in FIGS. 16-18 of referred to U.S. Pat. No. 8,851,709 patent may similarly be incorporated into the headlight assembly disclosed herein to operate the headlight in the accordance with the principles of the invention.

Although the present invention has been described with regard to an eyeglass configuration, it would be recognized that the cordless headlight assembly described herein may be applied to other types of headwear configurations. For example, a headband including one or more lens or a monocular assembly (which are referred to herein as eyewear) may incorporate the cordless headlight assembly described herein. Furthermore, although an LED type light is contemplated and discussed with the cordless headlight assembly described herein, it would be recognized that other types of lighting elements may be utilized without altering the scope of the invention claimed.

The invention has been described with reference to specific embodiments. One of ordinary skill in the art, however, appreciates that various modifications and changes can be made without departing from the scope of the invention as set forth in the claims. Accordingly, the specification is to be regarded in an illustrative manner, rather than with a restrictive view, and all such modifications are intended to be included within the scope of the invention.

Benefits, other advantages, and solutions to problems have been described above with regard to specific embodiments. The benefits, advantages, and solutions to problems, and any element(s) that may cause any benefits, advantages, or solutions to occur or become more pronounced, are not to be construed as a critical, required, or an essential feature or element of any or all of the claims.

As used herein, the terms "comprises", "comprising", "includes", "including", "has", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "of" refers to an inclusive "or" and not to an exclusive "or". For example, a condition A or B is satisfied by any one of the following: A is true (or present) and B is false (or not present); A is false (or not present) and B is true (or present); and both A and B are true (or present).

The terms "a" or "an" as used herein are to describe elements and components of the invention. This is done for convenience to the reader and to provide a general sense of the invention. The use of these terms in the description herein should be read and understood to include one or at least one. In addition, the singular also includes the plural unless indicated to the contrary. For example, reference to a composition containing "a compound" includes one or more compounds. As used in this specification and the appended claims, the term "or" is generally employed in its sense including "and/or" unless the content clearly dictates otherwise.

All numeric values are herein assumed to be modified by the term "about," whether or not explicitly indicated. The term "about" generally refers to a range of numbers that one of skill in the art would consider equivalent to the recited value (i.e., having the same function or result). In any instances, the terms "about" may include numbers that are rounded (or lowered) to the nearest significant figure.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A cordless headlight assembly comprising:
    a headlamp comprising:
        a housing; and
        a light source, wherein the light source is positioned within the housing; and
    a battery assembly, attached to the headlamp, comprising:
        a lower assembly comprising:
            an electronic assembly configured to control a voltage applied to the light source;
            a touch control switch element, electrically connected to the electronic assembly, configured to:
                detect a contact of the touch control switch element; and
                provide an indication of said detected contact to the electronic assembly, wherein the electronic assembly controls said voltage applied to the light source based on receiving the provided indication; and
        a battery pod, attached to the touch control switch element, comprising:
            a battery, therein, said battery configured to provide said voltage to the electronic assembly, wherein a connection between the battery pod and the touch control switch element is one of: a screw thread connection, a bayonet connection, a snap fit connection, a magnet connection, a ball plunger connection, an expanding collar connection and a cam lock coiled spring connection.

2. The assembly of claim 1, further comprising:
    a connecting element attached to the lower assembly.

3. The assembly of claim 2, wherein the connecting element is one of: a "T-slot" connector, a slotted connector, and a screw thread connector.

4. The assembly of claim 1, wherein said battery pod is removably attached to the touch control switch element.

5. The assembly of claim 1, wherein the light source comprises:
    at least one light emitting diode.

6. The assembly of claim 5, wherein the at least one light emitting diode emits a light in one of: a ultra-violet light range, a visible light range and an infra-red light range.

7. The assembly of claim 1, wherein the headlamp is pivotally attached to the lower assembly.

8. The assembly of claim 1, wherein the touch control switch element comprises:
    a mechanical switch, wherein the contact causes a change in a position of the switch.

9. The assembly of claim 1, wherein the touch control switch element comprises:
    a capacitive switch, wherein the contact causes a change in a capacitance of said capacitive switch.

10. An eyewear comprising:
    a frame configured to:
        attach to a user;
    a headlight assembly, attached to the frame, comprising:
        a housing comprising:
            at least one lighting element;
        a battery pod element, attached to the head light assembly, comprising:
            a lower element comprising:
                a circuit configured to:
                    control application of a voltage to the at least one lighting element;
                a touch control switch element, electrically connected to the circuit, configured to:
                    detect a touch of the touch control switch element; and
                    provide an indication of said detected touch to the circuit, wherein the circuit controls application of the voltage to the at least one lighting element based on the provided indication; and
            a battery pod, attached to the touch control switch element, comprising:
                a battery configured to provide said voltage to the circuit, wherein a connection between the battery pod and the touch control switch element is one of: a screw thread connection, a bayonet connection, a snap fit connection, a magnet connection, a ball plunger connection, an expanding collar connection and a cam lock coiled spring connection.

11. The eyewear according to claim 10, wherein the frame is selected from one of: a headband, a monocular assembly, and an eyeglass.

12. The eyewear according to claim 10, wherein the frame comprises:
    at least one lens; and
    a telescopic lens associated with each of the at least one lens.

13. The eyewear according to claim 12, wherein an orientation of the at least one lighting element is substantially comparable to an orientation of the telescopic lens.

14. The eyewear according to claim 10, wherein the frame comprises a connection element and the headlight assembly comprises a matching connection element.

15. The eyewear according to claim 14, wherein the connection element is a T-slot connector.

16. The eyewear according to claim 15, wherein an orientation of the battery pod is adjustable with respect to the frame.

17. The eyewear according to claim 10, wherein the housing is pivotally attached to the lower assembly.

18. The eyewear according to claim 10, wherein the touch control switch element comprises:

a mechanical switch, wherein the touch causes a change in a state of the switch.

19. The eyewear according to claim 10, wherein the touch control switch element comprises:
a capacitive switch, wherein the touch causes a change in a capacitance of the capacitive switch.

\* \* \* \* \*